United States Patent
Oguma

[11] Patent Number: 6,093,484
[45] Date of Patent: Jul. 25, 2000

[54] METHOD FOR THE PRODUCTION OF GLASS PRODUCT

[75] Inventor: Hironori Oguma, Tokyo, Japan

[73] Assignee: Hoya Corporation, Tokyo, Japan

[21] Appl. No.: 09/053,520

[22] Filed: Apr. 2, 1998

[30] Foreign Application Priority Data

Apr. 4, 1997 [JP] Japan ..................................... 9-086369

[51] Int. Cl.[7] .............................. B32B 3/26; H04N 3/14; H04N 5/335
[52] U.S. Cl. .................................. 428/312.2; 428/304.4; 348/294; 348/311; 359/361; 501/45
[58] Field of Search .................... 428/155, 304.4, 428/307.3, 312.6, 315.5, 312.2; 501/44, 45, 904; 359/350, 361, 355, 356; 65/61, 65, 104, 30.11; 348/294, 311

[56] References Cited

U.S. PATENT DOCUMENTS

| | | |
|---|---|---|
| 5,227,343 | 7/1993 | Osuka et al. ............................... 501/77 |
| 5,242,868 | 9/1993 | Hara ........................................... 501/44 |
| 5,249,076 | 9/1993 | Fujiwara et al. ......................... 359/350 |
| 5,668,066 | 9/1997 | Oguma et al. ............................. 501/45 |
| 5,793,544 | 8/1998 | Ogihara et al. .......................... 359/885 |

*Primary Examiner*—Deborah Jones
*Assistant Examiner*—Stephen Stein
*Attorney, Agent, or Firm*—Nixon & Vanderhye

[57] ABSTRACT

Phosphate or flurorophosphate glass surfaces are polished to smooth, highly accurate surfaces using a glass polishing liquid having a pH approximating the pH of the glass being polished. A highly polished glass surface results suitable for use optical filters and solid camera devices and solid image sensors. Phosphate and fluorophosphate glass filters and the like so formed have hair-like surface flaws, if any, of a width of 7 $\mu$m or less.

4 Claims, 1 Drawing Sheet

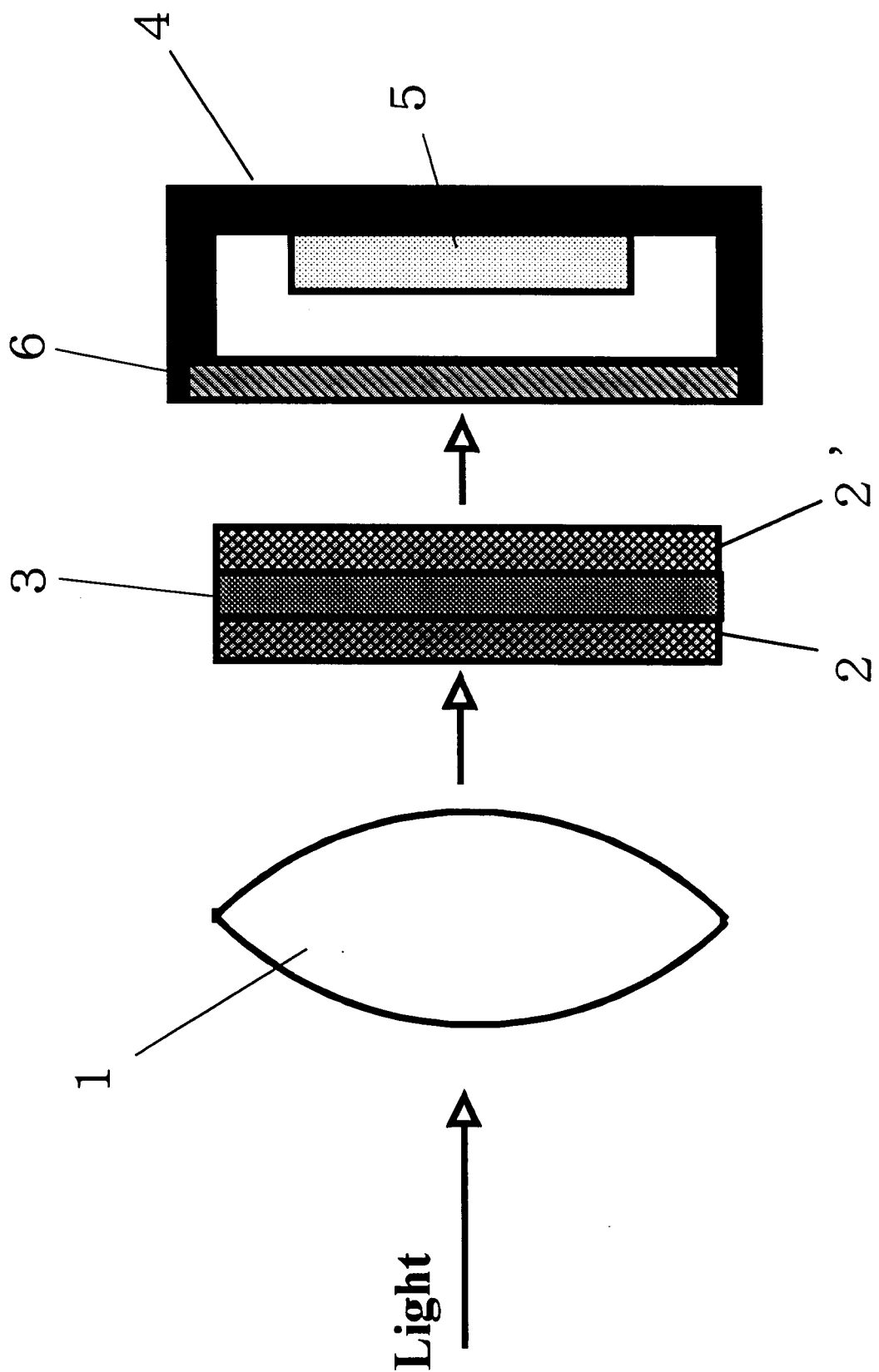

METHOD FOR THE PRODUCTION OF GLASS PRODUCT

BACKGROUND OF THE INVENTION

1. Field of the Invention

The present invention relates to a method for the production of a glass product. More specifically, it relates to a method for the effective production of a glass product having a surface polished highly accurately, particularly a phosphate glass product or a fluorophosphate glass product, as well as a filter formed of the glass product obtained by the above method, and a solid image sensor device for which the filter is adapted.

2. Explanation of Related Art

Generally, glass-containing phosphate as a glass network former has excellent transmission in an ultraviolet region, and it is therefore used in fields where the transmission in an ultraviolet region is important. A colored glass (color filter glass) containing phosphate as a glass network former has been more stably colored with a transition metal ion such as $Fe^{2+}$ or $Cu^{2+}$ than a color filter glass containing $SiO_2$ or $B_2O_3$ as a glass network former, and is therefore used in various purposes.

Meanwhile, for improving glass in stability, optical constants, transmission characteristics and chemical durability, it is general practice to add alkali metal oxides such as $Li_2O$, $Na_2O$, $K_2O$ and $Cs_2O$, alkaline earth metal oxides such as CaO, MgO, SrO and BaO, other divalent metal oxides such as ZnO and PbO or F to a glass. When the above components are added as required, the glass can have stability sufficient for shapability and can be mass-produced without causing devitrification.

It is known that the above glass is used for an infrared absorption filter which is a spectral luminous efficiency correction filter of CCD (charge coupled device) for use, e.g., in a color VTR camera. The glass used for the above filter is imparted with the property of absorbing light having a longer wavelength than 700 nm by incorporating CuO as a colorant thereinto and utilizing the absorption by $Cu^{2+}$ ion. In this case, the $Cu^{2+}$ exhibits excellent absorption only when phosphate is used as a main component of a glass network former. For the above filter, therefore, there is used a phosphate glass or a fluorophosphate glass to which CuO is incorporated. The glass is polished so as to have a thickness of approximately 1.0 to 2.0 mm, and is used as a filter for an image sensor element such as CCD. In the image sensor element, the demand for high density has been increasing, and an area per pixel of photodiode is exceedingly decreased. There is therefore a phenomenon that even a flaw or scratch having a size of the order of several micrometers which has not caused any problem so far causes a detrimental effect on an image. For example, a flaw having a size of greater than about 7 $\mu$m takes or occupies the region for almost one pixel of photodiode, and an image defect in a solid image sensor device is observed. When an infrared absorption filter is disposed close to CCD and when the number of pixels per unit area is large, a filter for use in the above field is therefore required to have a highly accurate polished surface (polish flaw width $\leq 7$ $\mu$m).

The above phosphate glass containing phosphate as a glass network former essentially has a poor glass structure, and it is therefore liable to have polish-induced flaws and is easily chemically reactive. However, an increase in the hardness of the glass is limited in terms of the glass composition, and unlike a borosilicate glass, it is difficult to obtain a hardness sufficient for easy polishing. When desired transmission characteristics, chemical durability, glass stability adequate for mass-producibility and other optical characteristics are intended to be maintained, an improvement in the composition is limited. It is therefore difficult to impart a phosphate glass or a fluorophosphate glass with a hardness which a borosilicate glass has, and most glasses of this type is so-called least polishable glass having a low hardness. There are therefore limits placed on stably obtaining a highly accurate polished surface (polish flaw width $\leq 7$ $\mu$m) for the glasses of the above type even if the glass composition is improved or the polishing technique is improved.

For polishing the above phosphate glass or fluorophosphate glass, conventionally, there is employed a method in which the glass is polished with a polishing liquid prepared by adding an abrasive such as $CeO_2$ to water. Generally, as the load for polishing is decreased or as the rotation rate for polishing is decreased, the accuracy of the polished surface of a glass having a low hardness increases. However the phosphate glass and the fluorophosphate glass not only have a considerably low hardness, but also are highly chemically reactive, and therefore, they have the following defects. They show limits in polish accuracy, latent flaws are liable to occur, and it takes a long period of time to polish them.

SUMMARY OF THE INVENTION

Under the circumstances, it is therefore a first object of the present invention to provide a method for effectively producing a glass product having a highly accurately polished surface, a particularly phosphate glass or fluorophosphate glass product.

It is a second object of the present invention to provide a method for the production of a filter which is suitable for a solid image sensor device using CCD and is formed of a glass product obtained by the above method.

It is further a third object of the present invention to provide a filter which is formed of a phosphate glass or fluorophosphate glass having a polish flaws decreased in size and having an ultra-smooth surface and which is suitable for a solid image sensor device using CCD.

Further, it is a fourth object of the present invention to provide a solid image sensor device using the above filter.

For achieving the above objects, the present inventor has made diligent studies on a method of polishing glass surfaces with polishing liquids, and as a result, the following has been found. In conventional polishing methods, relatively large flaws (> width 7 $\mu$m) are liable to remain in a polished surface. This is presumably because a chemical reaction takes place between a glass surface and water during the surface polishing. That is, soluble components such as alkali metal oxide and alkaline earth metal oxide contained in glass components undergo an ion-exchange reaction with hydronium ion ($H_3O^+$) contained in the water to be selectively eluted, and the eluted components corrode the glass network. Further, oxides forming the glass are hydrolyzed so that the entire surface of the glass is dissolved. From the above viewpoint, the rate or velocity of the reaction between the glass and the polishing liquid is decreased by allowing the pH of the polishing liquid used for polishing the glass to approximate to the pH of the glass, and as a result, there can be formed an ultra-smooth surface of which polish flaws are very small (< width 7 $\mu$m). On the basis of the above finding, the present invention has been completed.

That is, according to the present invention, there is provided (1) a method for the production of a glass product, which comprises allowing the pH of a polishing liquid to approximate to the pH of glass of which the surface is to be polished with the polishing liquid, and then polishing the glass surface with the polishing liquid.

According to the present invention, there is also provided (2) a method for the production of a filter, which comprises adapting the glass product obtained by the above method (1) for the filter.

According to the present invention, further, there is provided (3) a filter formed of a phosphate glass or a fluorophosphate glass having a surface of which the hair-like flaws have a width of 7 $\mu$m or less.

Further, according to the present invention, there is provided a solid image sensor device which comprises adapting the above filter (3) for the solid image sensor device.

BRIEF DESCRIPTION OF DRAWINGS

FIG. 1 schematically shows a constitution of one example of a solid image sensor device for which the filter of the present invention is adapted. In FIG. 1, numeral 1 indicates an optical lens, numerals 2 and 2' indicate optical low-pass filters, numeral 3 indicate an infrared absorption filter, numeral 4 indicates a package, numeral 5 indicates a CCD chip, and numeral 6 indicates an enveloping glass.

BEST MODES OF THE INVENTION

In the method according to the present invention for the production of a glass product, the surface of a glass is polished with a polishing liquid, and in this case, it is required to allow the pH of the polishing liquid to approximate to the pH of the glass to be polished, before the glass is polished. The polishing liquid refers to a liquid prepared by dispersing an abrasive in a water-based medium (to be referred to as "abrasive-containing water-based dispersion" hereinafter), and preferably, the pH of the abrasive-containing water-based dispersion is adjusted, in advance, such that the difference between the pH of the abrasive-containing water-based dispersion and the pH of the glass to be polished is within ±1.0. In this case, the glass is polished with a polishing liquid having a pH to which the glass is stable, and the chemical reaction between the glass and the abrasive-containing water-based dispersion can be therefore inhibited. As a result, polish flaws which are liable to occur in conventional polishing methods do not easily occur, and a glass having an ultra-smooth surface can be stably obtained. From the above viewpoint, more preferably, the pH of the abrasive-containing water-based dispersion is adjusted such that the difference between the pH of the abrasive-containing water-based dispersion and the pH of the glass to be polished is within ±0.7, and particularly preferably the pH of the abrasive-containing water-based dispersion is adjusted such that the difference between the pH of the abrasive-containing water-based dispersion and the pH of the glass to be polished is within ±0.5.

In the present invention, glass is measured for a pH by the following method. That is, 30 g of a powder of glass to be polished, the powder having a particle diameter of 1.4 mm to 850 $\mu$m, is added to 100 ml of deionized water having a temperature of about 50° C., and the mixture is stirred with a stirrer in a temperature-regulating vessel having a temperature of about 50° C. until the deionized water shows a constant pH. The so-obtained constant pH value is taken as a pH of the glass to be polished.

The water-based medium used for the preparation of the polishing liquid (abrasive-containing water-based dispersion) in the present invention includes water and a mixture of water with a water-soluble organic solvent, specifically, a mixture of water with any one of lower alcohols, ketones, ethers or surfactants. Generally, water is used. Further, the abrasive is not specially limited, and it can be selected from those which are conventionally used as an abrasive for glass. For example, the abrasive preferably includes inorganic powders such as a cerium oxide powder, a titanium oxide powder and a colloidal silica powder. The particle size distribution of the abrasive is generally 0.2 to 30 $\mu$m, preferably 0.2 to 20 $\mu$m, particularly preferably 0.2 to 12 $\mu$m. The above particle size distribution includes a particle size distribution of a secondary particle diameter of the abrasive.

The above abrasives may be used alone or in combination. The concentration of the abrasive based on water is preferably 1 to 20% by weight, more preferably 3 to 15% by weight.

The pH of the above abrasive is adjusted with a pH adjuster. When the pH is adjusted with an alkali, the pH adjuster includes NaOH, $Na_2CO_3$, $NaHCO_3$, $Na_2CO_3$♦$NaHCO_3$, $Na_3PO_4$, $Na_2HPO_4$, $NaH_2PO_4$, $Na_4P_2O_7$, $Na_6P_3O_{10}$, $Na_6P_4O_{13}$, $(NaPO_3)_3$, $(NaPO_3)_4$, $(NaPO_3)_6$, $2Na_2O$♦$SiO_2$♦$5H_2O$ and $Na_2O$♦$SiO_2$♦$5H_2O$. These may be used alone or in combination. When the pH is adjusted with an acid, the pH adjuster includes HCl, $HNO_3$, $H_2SO_4$, $H_2CO_3$ and $H_3PO_4$. These may be used alone or in combination.

Further, the polishing liquid may be prepared, for example, by a method in which glass which is the same as a glass to be polished is immersed in a water-based medium to elute glass components in water, thereby to prepare a water-based solution having a pH difference of generally within ±1.0, preferably within ±0.7, particularly preferably within ±0.5, from the pH of the glass, then, an abrasive is added to the water-based solution to prepare an abrasive-containing water-based dispersion. In this case, when glass which is the same as a glass to be polished is immersed in a water-based medium to elute glass components in water, the glass components can be eluted for a short period of time by heating the water-based medium.

The glass to which the method of the present invention is applied is not specially limited. For example, when the glass is liable to have polish flaws due to its low hardness and further easily undergoes a chemical reaction, the polish flaws can be decreased in width, and the glass can be highly accurately polished, according to the present invention. In view of the above point, the present invention produces a remarkable effect when the method of the present invention is applied to glass of the above kind. The glass which is liable to have polish flaws due to its low hardness and further easily undergoes a chemical reaction includes a phosphate glass and a fluorophosphate glass.

The phosphate glass to which the present invention is applied is, for example, a phosphate glass containing a basic glass containing, based on weight, 75 to 88% of $P_2O_5$, 6 to 15% of $Li_2O$, 3 to 14% of $Al_2O_3$, 0 to 5% of $Na_2O$, 0 to 5% of $K_2O$, 0 to 5% of $B_2O_3$, 0 to 5% of $ZrO_2$, 0 to 5% of $TiO_2$, 0 to 5% of $La_2O_3$, 0 to 5% of MgO and 0 to 5% of ZnO, and 0.5 to 10 parts by weight, per 100 parts by weight of the basic glass, of CuO, as is disclosed in JP-B-52-5330. The above phosphate glass absorbs almost no light having a wavelength of 400 to 600 nm and intensely absorbs light having a wavelength over 600 nm.

Further, there is another phosphate glass containing a basic glass containing, based on weight, 75 to 90% of $P_2O_5$, 7.5 to 20% of $Al_2O_3$, 0 to 15%, as a total content, of $B_2O_3$ and $SiO_2$, 1 to 25%, as a total content, of BaO, MgO, CaO and SrO, 0 to 15%, as a total content, of $Y_2O_3$, $La_2O_3$, $ZrO_2$, $Ta_2O_3$ and $TiO_2$ and 0 to 10% of PbO, and 0.4 to 15.0 parts by weight, per 100 parts by weight of the basic glass, of CuO, as is disclosed in JP-A-62-128943. The above phosphate glass shows a high transmittance to light having a wavelength of 400 to 550 nm, sharply cuts the transmission of light having a wavelength of 600 to 700 nm, and has comparatively high chemical durability.

There is further another glass containing, based on weight, 35 to 50% of $P_2O_5$, 0 to 5% of $Li_2O$, 0 to 12% of $Na_2O$, 0 to 20% of $K_2O$, 0 to 20% of $Cs_2O$, 1.5 to 20% of $R_2O$ (R=alkali metal), 17 to 48% of ZnO, 0 to 7% of CaO, 0 to 7% of CaO, 0 to 7% of SrO, 0 to 12% of BaO, 0 to 15% of R'O (R'=alkaline earth metal) and 2 to 12%; of CuO, as is disclosed in U.S. Pat. No. 5,668,066 (corresponding to JP-A-9-100136). The above glass is excellent in the characteristic of transmittance in an ultraviolet region, mass-producible stability, processability and weatherability.

The fluorophosphate glass to which the present invention is applied is, for example, a fluorophosphate glass having a $P_2O_5$ content of 45% by weight or less and an $AlF_3$ content of at least 1% by weight, particularly a fluorophosphate glass containing a basic glass containing, based on weight, 5 to 45% of $P_2O_5$, 1 to 35% of $AlF_3$, 10 to 75%, as a total content, of $RF_2$ (fluorides of divalent metals, Ba, Sr, Ca, Mg, Zn and Pb), 0 to 40%, as a total content, of $R^1F$ (fluorides of monovalent metals, Li, Na and K) and 0 to 15%, as a total content, of $R^2F$ (fluorides of metals having a valence of 3 to 5, La, Y, Gd, Si, B, Zr and Ta), and 0.2 to 15 parts by weight, per 100 parts by weight of the basic glass, of CuO, as is disclosed in JP-A-1-219037. However, the glass to which the method of the present invention is applied shall not be limited to the above kinds of glass.

The fluorophosphate glass having the above composition is excellent in weatherability and light transmittance, and in this regard, it is suitable as a color correction filter, for example, for a solid image sensor device using CCD.

The method of polishing a glass in the present invention is not specially limited, and there can be employed a method which is generally used as a conventional method of polishing a glass. For example, there can be employed a method in which a glass to be polished is fit in a polishing apparatus, the glass is polished with the polishing liquid with rotating until it has a predetermined thickness value and then the polishing liquid is removed by washing by known means.

In the above manner, there can be easily produced a glass product having an ultra-smooth surface of which the hair-like flaws have, generally, a width of 7 μm or less.

The method of the present invention can be applied not only to polishing treatment but also to, for example, the washing of a polishing liquid.

In the step of washing after the polishing treatment, generally, the polishing liquid and other stains are removed by means of an ultrasonic cleaning apparatus. The method of the present invention can be also applied to the pH adjustment of a washing liquid used in the washing step, and it can be also applied to the pH adjustment of a rinse liquid used in a subsequent rinse treatment. That is, when a water-based washing liquid is used in an ultrasonic cleaning apparatus, the corrosion of a glass can be remarkably decreased by adjusting the pH of the water-based washing liquid such that the difference between the pH of the water-based washing liquid and the pH of the glass which is to be washed is within ±1.0. Further, latent flaws scarcely occur as compared with a case where no pH adjustment is carried out.

According to the present invention, further, there is provided a method for the production of a filter from the glass product obtained as described above, and there is also provided a filter formed of a phosphate glass or a fluorophosphate glass having a surface of which hair-like flaws have a width of 7 μm or less.

The above filter is used as a filter for a solid image sensor element such as CCD, specifically as a spectral luminous efficiency correction filter.

A solid image sensor element such as CCD is recently downsized and highly increased in density, and is accordingly required to give high-quality images. With the downsizing of a solid image sensor element, the pixel size is decreased from a conventional ½ inch system to a ¼ inch system and an area per pixel becomes extremely small, and therefore a fine flaw in a filter positioned in front of the solid camera device also poses a problem. A hair-like flaw having a width of larger than 7 μm destroys more than one pixel, and it therefore breaks an image. There is therefore desired a filter having an ultra-smooth surface of which flaws have a width of 7 μm or less. Therefore, the glass product obtained according to the above method of the present invention is suitable as a filter for the above solid image sensor element.

Further, according to the present invention, there is also provided a solid image sensor device for which the above filter formed of a phosphate glass or a fluorophosphate glass is adapted. The above solid image sensor device is constituted mainly of, e.g., CCD, an infrared absorption filter, an optical low-pass filter and an optical lens. As the filter is positioned nearer to CCD, polish flaws on the filter surface are more liable to break an image. It is therefore required that the width of hair-like flaws on the filter surface be smaller as the filter is positioned nearer to CCD.

The solid image sensor device for which the filter of the present invention is adapted is not specially limited, while the filter of the present invention more efficiently produces its effect when it is used in a solid image sensor device structured as shown in FIG. 1, as will be explained below.

FIG. 1 schematically shows a constitution of one example of a solid image sensor device for which the filter of the present invention is adapted. Light from an object passes through an optical lens 1, passes through a unit composed of optical low-pass filters 2 and 2' and an infrared absorption filter 3 and comes into a package 4 having a CCD chip 5 and an aperture glass 6, and it is converted to electric signals and then electrically processed.

When the filter of the present invention is used as the infrared absorption filter 3 in a solid image sensor device having the above constitution, i.e., a device having the infrared absorption filter 3 alone or a device having the infrared absorption filter 3 positioned between the optical low-pass filters 2 and 2', generally, the filter 3 is positioned nearer to CCD than an infrared absorption filter which is positioned so as to be combined with an optical lens system (not shown), and the filter of the present invention therefore produces its effect more efficiently. FIG. 1 shows an embodiment using two optical low-pass filters, while there is also another case using one or three optical low-pass filters. The number of the optical low-pass filters shall not be limited.

According to the present invention, there can be easily produced a glass product, particularly, a phosphate glass product or a fluorophosphate glass product, having a surface which is highly accurately polished (width of surface flaws $\leq 7$ μm). The glass product having a highly accurately polished surface is suitably used, for example, as a filter for a solid image sensor element.

The present invention will be explained more in detail with reference to Examples hereinafter, while the present invention shall not be limited by Examples.

Four kinds of glass A to D having compositions shown in Table 1 were used as glass compositions.

The glass A, the glass B and the glass C were phosphate glass, and the glass D was fluorophosphate glass. The glass A, the glass B and the glass D contained CuO, and are mainly used as filters for the color correction of CCD. The glass C are an optical glass having a low refractive index and a low dispersion and is used as a camera lens.

PREPARATION EXAMPLE

Preparation of Glass A to D

A glass composition shown in Table 1 was prepared, melted in a platinum crucible at 800 to 1,200° C. and stirred to form a homogeneous composition. Then, the composition was clarified to remove foams, cast into a mold and gradually cooled to obtain a glass block.

An internal strain of the glass was removed according to a conventional method, and the glass block was sliced in the form of a flat plate having a size of 20.0×30.0×1.40 mm. Further, the glass sides were chamfered such that broken pieces of glass were not included during the polishing of the glass. In this manner, testing glass plates A to D were prepared.

TABLE 1

| | | Kind of glass | | | | |
|---|---|---|---|---|---|---|
| | | A | B | C | D | |
| Com- | $P_2O_5$ | 78.0 | 48.0 | 70.0 | $Al(PO_3)_3$ | 32.0 |
| po- | $Al_2O_3$ | 10.0 | 2.0 | 9.0 | $AlF_3$ | 9.0 |
| si- | $Na_2O$ | — | — | 0.5 | LiF | 3.0 |
| tion | $Li_2O$ | 9.0 | — | — | | 5.0 |
| (wt %) | $K_2O$ | — | 6.0 | 9.5 | NaF | 1.0 |
| | ZnO | — | 35.5 | — | | |
| | CaO | — | 3.0 | 2.0 | $CaF_2$ | 11.0 |
| | BaO | — | 4.0 | — | $BaF_2$ | 18.0 |
| | $B_2O_3$ | — | — | 4.0 | $SrF_2$ | 17.5 |
| | MgO | — | — | 5.0 | $MgF_2$ | 2.5 |
| | CuO | 3.0 | 1.0 | — | | 1.0 |
| | $As_2O_3$ | — | 0.5 | — | | — |
| | Total | 100.0 | 100.0 | 100.0 | | 100.0 |

Example 1

1,000 Grams of a cerium oxide powder (trade name: MIRAK S-2, supplied by Mitsui Mining & Smelting Co., Ltd.) as an abrasive was added to 10 liters of pure water, and the mixture was adjusted to a pH shown in Table 2 with sodium hydroxide, to obtain a polishing liquid.

The glass A, the glass B, the glass C and the glass D obtained in Preparation Example were polished as follows.

Eighty sheets of each glass were fixed onto a polishing apparatus and polished with the polishing liquid under a load of 80 g/cm$^2$ at a rotation rate of about 60 rpm until the sheets had a thickness of 1.20 mm. The polishing treatments were carried out at two steps. In the first step, the abrasive having a larger particle diameter (0.2~30 µm) was used, and in the second step, the abrasive having a smaller particle diameter (0.2~12 µm) was used. The particle distribution used herein is a particle distribution including the secondary particles of the abrasive. After the polishing, the polishing liquid was completely removed from each glass surface, and the obtained glass products were measured in a dark room for an accuracy of each polished surface. A glass having a hair-like flaw having a width of over 7 µm was taken as X (bad), and a glass having a hair-like flaw having a width of less than 7 µm was taken as ◯ (good). Table 2 shows the results together with pH values of each glass. The measurement of pH values was carried according to the method described in the present specification.

Example 2 and Comparative Example 1

Example 1 was repeated except that the pH of the polishing liquid was changed as shown in Table 2. The resultant glass products were measured for an accuracy of each polished surface. Table 2 shows the results.

Example 3

A polishing liquid was prepared in the same manner as in Example 1 except that the pure water was replaced with an aqueous solution prepared by immersing glass in pure water to dissolve glass components in the pure water and that the aqueous solution was pH-adjusted as shown in Table 2. Polishing was carried out in the same manner as in Example 1 except that the polishing liquid was replaced with the above polishing liquid. The resultant glass products were measured for an accuracy of each polished surface. Table 2 shows the results.

Comparative Example 2

A polishing liquid was prepared in the same manner as in Example 1 except that the pH adjustment was not carried out, and polishing was carried out in the same manner as in Example 1. The resultant glass products were measured for an accuracy of each polished surface. Table 2 shows the results.

TABLE 2

| | | Kind of glass | | | |
|---|---|---|---|---|---|
| | | A | B | C | D |
| pH value of glass | | 5.5 | 7.8 | 8.0 | 8.2 |
| Ex.1 | pH adjusted | ◯(5.5) | ◯(7.8) | ◯(8.0) | ◯(8.2) |
| Ex.2 | pH adjusted | ◯(6.3) | ◯(7.5) | ◯(8.8) | ◯(7.6) |
| Ex.3 | pH adjusted | ◯(6.0) | ◯(7.4) | ◯(7.8) | ◯(8.0) |
| CEx.1 | pH adjusted | X(4.0) | X(8.9) | X(2.0) | X(9.3) |
| CEx.2 | pH not adjusted | X(6.7) | X(6.7) | X(6.7) | X(6.7) |

Notes: Ex = Example, CEx. = Comparative Example
The mark "◯" denotes good and the mark "X" bad.
Parenthesized values show pH values of polishing liquids at room temperature.

In all the polished glass plates obtained in Examples 1, 2 and 3, hair-like flaws on their polished surfaces had a width of smaller than 5 µm and a depth of 4 µm or less, and excellent results were obtained.

In contrast, in Comparative Example 1, the pH of the polishing liquid has not been allowed to approximate to the pH of the glass, or the pH of the polishing liquid differed from the pH of the glass by more than 1, and the polished surface of the polished glass plate had a number of flaws having a width of larger than 7 µm. In Comparative Example 2, there was employed a conventional polishing method in which no pH adjustment was carried out, and the polished surface of the polished glass plate had a number of flaws having a width of larger than 30 µm.

What is claimed is:

1. A phosphate or fluorophosphate glass filter having a smooth surface and any flaws having a width of at most 7 µm.

2. A charge coupled device comprising a phosphate or fluorophosphate glass filter having a smooth surface and any flaws having a width of at most 7 µm.

3. A solid image sensor device comprising the filter of claim 2.

4. The solid image sensor device of claim 3 wherein the solid image sensor device is a solid camera device using a charge coupled device.

* * * * *